United States Patent [19]
Pease

[11] 3,747,206
[45] July 24, 1973

[54] METHOD OF MAKING A HEATING ELEMENT AND FITTING ASSEMBLY

[76] Inventor: James F. Pease, 100 View Point Dr., Dayton, Ohio 45459

[22] Filed: Dec. 6, 1971

[21] Appl. No.: 205,200

Related U.S. Application Data

[62] Division of Ser. No. 40,258, May 25, 1970, Pat. No. 3,657,519.

[52] U.S. Cl. ............... 29/611, 29/421, 113/116 UT, 219/336, 219/523, 219/536, 338/317, 339/130 R
[51] Int. Cl. ............................................. H05b 3/00
[58] Field of Search ................. 29/611, 421 M, 610; 174/65; 285/39; 113/116 U; 219/536, 318, 336, 523, 537, 542; 338/326, 317, 240; 339/130, 132

[56] References Cited
UNITED STATES PATENTS

| R13,095 | 3/1910 | Ruby | 339/130 R |
|---|---|---|---|
| 1,465,484 | 8/1923 | Richter | 113/116 UT |
| 1,928,910 | 10/1933 | Riemenschneider | 113/116 UT |
| 2,476,656 | 7/1949 | Galbraith | 113/116 UT |
| 2,630,469 | 3/1953 | Miller | 339/130 R X |
| 3,118,124 | 1/1964 | Bleckmann | 338/317 |
| 3,205,573 | 9/1965 | Seal et al. | 29/474.4 |
| 3,354,294 | 11/1967 | Kollar et al. | 219/536 |
| 3,501,828 | 3/1970 | Schultz | 29/421 |

*Primary Examiner*—Charles W. Lanham
*Assistant Examiner*—V. A. Dipalma
*Attorney*—William R. Jacox

[57] ABSTRACT

An electrical heating element has an end portion secured to a tubular fitting which extends through an opening within a wall of a liquid heating vessel. The fitting is produced by drawing and deforming a sheet metal disk to form a flange portion and a tubular portion having a corrugated wall configuration defining external threads. The fitting is sealed to the wall by a resilient gasket and is secured by a nut member which is also produced by drawing and deforming a sheet metal disk to form a flange portion and a tubular portion having a corresponding corrugated wall configuration defining complementary threads. A fitting and nut member may be used for attaching each end of a sheath-type heating element to a wall and may also be constructed for mounting a cartridge-type heating unit on the wall. The fitting may be secured to the heating element by magnetically deforming the fitting.

6 Claims, 4 Drawing Figures

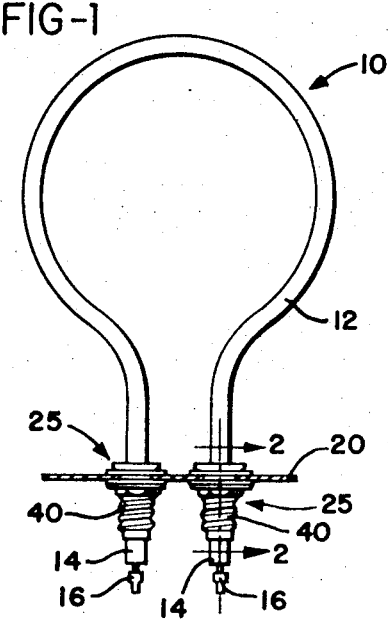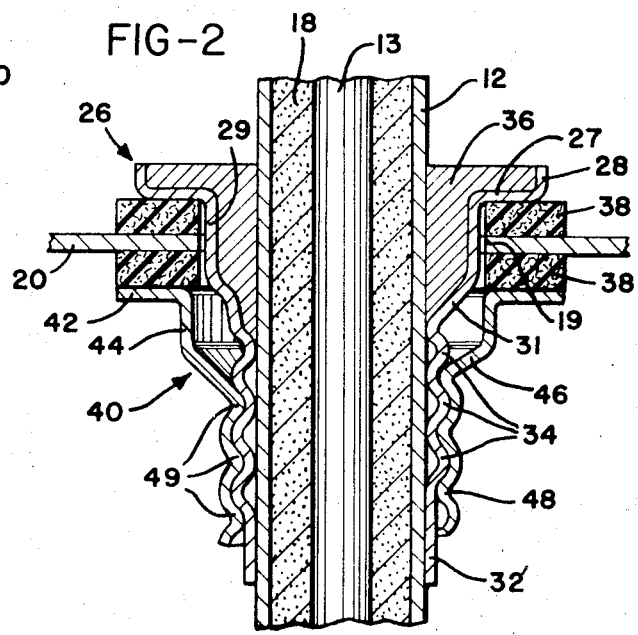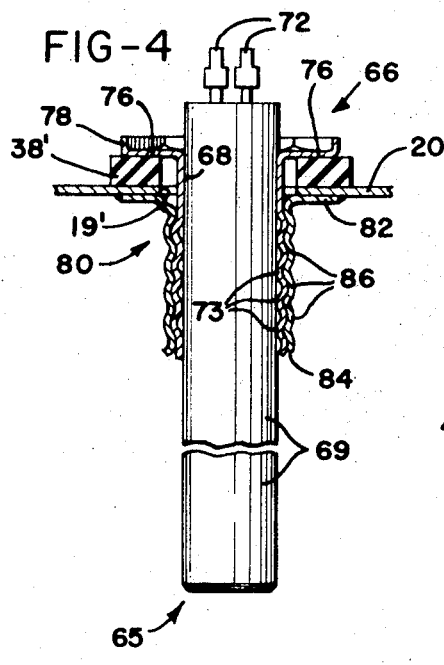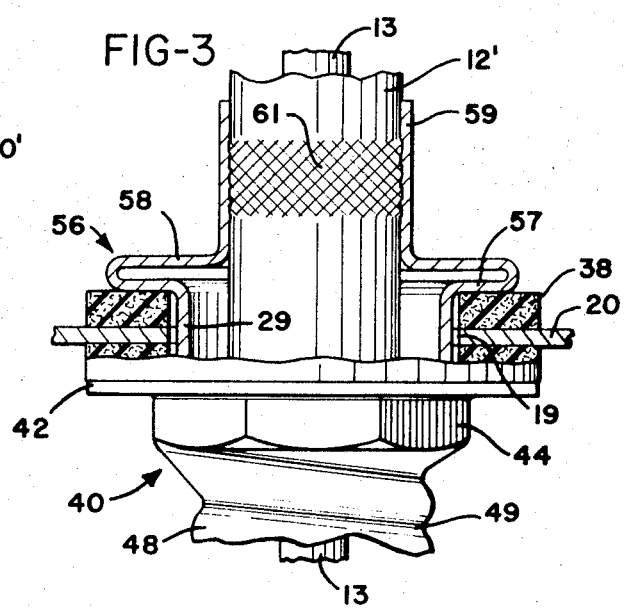

METHOD OF MAKING A HEATING ELEMENT AND FITTING ASSEMBLY

RELATED APPLICATION

This application is a division of U. S. application Ser. No. 40,258, filed May 25, 1970, and now issued as U.S. Pat. No. 3,657,519.

BACKGROUND OF THE INVENTION

In an automatic dishwashing machine, it is common to install an electrical immersion heating element within the sump portion of the tank for heating water which is recirculated within the tank and/or for heating air during the drying period of the washing cycle. Usually the heating element consists of an elongated rod-like metallic sheath which is formed to a predetermined configuration according to the location of the element within the sump. The sheath encloses or confines a high resistance electrical conductor or wire which is surrounded by a thermally conductive electrical insulation. The heating element is supported within the sump by a pair of bulkhead fittings which are mounted on the end portions of the sheath and extend through corresponding openings within the bulkhead or sump wall. The ends of the high resistance wire are connected to corresponding low resistance conductors which extend through the tubular fittings to corresponding terminals.

Commonly, the tubular bulkhead fittings are machined from metal bar stock as, for example, shown in U. S. Pat. No. 3,354,294. Each fitting includes a solid flange portion and a tubular portion with machined threads for receiving a nut which is effective to secure the fitting to the bulkhead or wall adjacent a resilient washer which forms a liquid tight seal between the fitting and the wall. It has also been pro-posed to form the bulkhead fitting from sheet metal and to flare the sheet metal to form a flange for securing the fitting to the wall, as disclosed in U. S. Pat. No. 3,118,124.

The above described method of machining and installing an electrical immersion sheath-type heating element within the sump of a dishwashing machine, is also commonly used for constructing and installing sheath-type heating elements within other types of liquid heating tanks or vessels. In order to prevent corrosion of the fittings, they are usually machined from stainless steel, brass or from nickel alloys. As a result, the fittings add significantly to the production cost of a heating element and fitting assembly.

A similarly constructed metal fitting is frequently used for installing a cartridge-type immersion heating unit within a water heating tank or vessel. An example of such a cartridge-type heating element and fitting assembly is disclosed in U.S. Pat. No. 2,691,089. In this type of heating element, usually a high resistance spiral conductor or wire is enclosed within a cylindrical case which is cantileveredly supported by a single bulkhead fitting. A pair of low resistance electrical conductors extend through the fitting for connecting the ends of the wire to corresponding terminals. Commonly, the bulkhead fitting for a cartridge-type heating unit has machine threads and a hexagonal head for threading the fitting into a nut member which is welded or otherwise secured to the wall of the vessel. Due to the exposure of the bulkhead fitting to the liquid which is to be heated, the fitting is also commonly machined from either stainless steel or brass or a nickel alloy, and thus adds significantly to the production cost of the cartridge heating unit assembly.

SUMMARY OF THE INVENTION

The present invention is directed to an improved heating element and bulkhead fitting assembly wherein the production cost of the bulkhead fitting is significantly reduced without any significant loss of strength for supporting the heating element. The assembly also provides for obtaining a fluid tight seal between the fitting and the bulkhead or wall which receives the heating element. As will become apparent, the heating element may comprise a preformed sheath-type heating element having separate end portions each of which is supported by a bulkhead fitting in accordance with the invention, or may comprise a cartridge-type heating element wherein only one end portion receives a bulkhead fitting constructed in accordance with the invention.

According to one embodiment of the invention, a tubular bulkhead fitting is formed by drawing and deforming a disk of sheet metal such as steel, brass or other non-ferrous material to produce a flange portion and a tubular wall portion with helical convolutions or threads defining a corrugated wall configuration in axial cross-section. The flange portion includes a generally cylindrical rim portion. The fitting is secured to an end portion of the heating element by solder or a sealant, and the tubular portion of the fitting is adapted to extend through a circular opening within the bulkhead or wall of a tank or other liquid receiving vessel.

The fitting and the corresponding end portion of the heating element are secured by a nut member which is also produced by drawing and deforming a sheet metal disk to form a hexagonal head portion integrally connecting a flange portion to a tubular portion with a corrugated wall configuration defining helical threads which mate with the helical threads on the fitting. Another embodiment of the invention shows a modification of the fitting and nut member for use in mounting a cartridge-type heating element or unit on a wall, and a further embodiment shows the attachment and sealing of the fitting to the heating element by means of magnetic impulses.

Other features and advantages of the invention will be apparent from the following description, the accompanying drawing and the appended claims.

BRIEF DESCRIPTION OF THE DRAWING

FIG. 1 is a plan view of a heating element and fitting assembly constructed in accordance with the invention and shown mounted on a bulkhead or wall;

FIG. 2 is an enlarged section taken generally on the line 2—2 of FIG. 1;

FIG. 3 is a section similar to FIG. 2 and showing a modification of the invention; and FIG. 4 shows another embodiment of the invention.

DESCRIPTION OF THE PREFERRED EMBODIMENT

The immersion heating element 10 shown in FIG. 1 is illustrative of the type commonly mounted within the sump of an automatic dishwashing machine for heating water and for also heating air during the drying period of the washing cycle. The heating element 10 includes a metallic sheath 12 which is usually formed from stainless steel or nickel alloy tubing and has a circular crosssectional configuration. While the sheath 12 shown in FIG. 1 is generally circular, the sheath may be formed in practically any configuration, as for example, rectangular with rounded corners or serpentine shaped.

The sheath 12 encloses a high resistance conductor or wire (not shown) having ends connected to corresponding low resistance conductors or wires 13 which extends concentrically through the end portions 14 of the heating element to terminal connectors 16. A thermally conductive electrical insulation 18 surrounds each conductor 13 and supports it concentrically within the corresponding end portion of the sheath 12.

In accordance with the present invention, each end portion 14 of the heating element 10 extends through a corresponding circular hole or opening 19 (FIG. 2) formed within a bulkhead or wall 20 such as the wall which defines the sump of an automatic dishwashing machine. Each end portion 14 of the heating element 10 is secured to the wall 20 by a fitting assembly 25 which includes a tubular bulkhead fitting 26 (FIG. 2) formed by drawing and deforming a sheet metal disk of suitable thickness, as for example, 0.010 inch, in successive or progressive steps to produce a radial outwardly projecting flange portion 27 which continues to form a generally cylindrical rim portion 28.

Each fitting 26 also includes a generally cylindrical wall portion 29 having an outer diameter slightly less than the diameter of the corresponding hole 19 within the wall 20. A tapered wall portion 31 converges inwardly from the cylindrical portion 29 and connects with a tubular wall portion 32 having an inside diameter substantially the same as the outside diameter of the metallic sheath 12. The tubular wall portion 32 is deformed to produce helical convolutions or threads 34, and as a result of the substantially uniform wall thickness of the fitting 26, the theads 34 define a corrugated wall configuration in axial cross-section. The fitting 26 is rigidly secured and sealed to the end portion of the sheath 12 by soft solder 36, but may be secured by some other means, for example, silver solder or epoxy.

After the fittings 26 are mounted on the end portions 14 of the heating element 10, the heating element 10 is installed by inserting the fittings into the corresponding openings 19 within the wall 20 with an annular resilient washer 38 positioned between each flange 27 and the inner surface of the wall 20. Preferably, the washer 38 is die cut from a rubber asbestos material, but may be formed from other resilient materials which will not deteriorate when exposed to the liquid within the vessel. Each fitting 26 and the corresponding end portion 14 of the heating element 10 is secured within its corresponding opening 19 by a nut member 40 which engages another resilient washer 38 positioned adjacent the outer surface of the wall 20.

Each nut member 40 is produced from a sheet metal disk of steel or non-ferrous material in the same manner as the fitting 26 by successively and progressively drawing and deforming the metal disk to produce a radial flange portion 42 which projects outwardly from a head portion 44 having a polyagonal configuration, such as hexagonal, for receiving a wrench. A generally frusto-conical or tapered wall portion 46 connects the head portion 44 with a tubular wall portion 48 having helical convolutions or threads 49 which mate with the threads 34 and form a similar corrugated wall configuration in axial cross-section. Thus after each nut member 40 is tightened on its corresponding fitting 26, the corresponding end portion 14 of the heating element 10 is rigidly secured to the wall 20, and the resilient seals 38 are sufficiently compressed to form a positive fluid-tight seal between the fittings 26 and the wall 20.

Referring to FIG. 3 which shows a modification of a fitting assembly constructed in accordance with the invention, a sheet metal disk is drawn and deformed to produce a fitting 56 having a radial flange portion 57 which projects outwardly from the cylindrical portion 29 and has its outer periphery integrally connected to an inwardly projecting radial flange portion 58. A tubular cylindrical portion 59 projects axially from the flange portion 58 and has an inner diameter the same as the outer diameter of a heating element sheath 12'. To this extent, the fitting 56 is similar in construction to the bulkhead fitting disclosed in U.S. Pat. No. 3,118,124.

In accordance with the present invention, the tubular portion 59 of the fitting 56 is secured and sealed to the metallic sheath 12' by magnetically deforming the tubular portion 59 with a surrounding coil which produces magnetic impulses of several hundred kiloamperes at a voltage level of several kilovolts. This causes the tubular portion 59 to shrink or compress into a knurled band 61 or flats formed on the outer surface of the metallic sheath 12'. One make of magnetic pulse metal forming equipment which has been determined satisfactory for deforming the tubular portion 59, is manufactured and marketed by Gulf General Atomic Incorporated, San Diego, Calif., under the trademark "Magneform". With a coil surrounding the tubular portion 59 and connected to this equipment, the magnetic impulses produced will generate substan-tially compressive forces on the tubular portion 59 and constrict it against the metallic sheath 12'. The remaining portion of the fitting assembly shown in FIG. 3 is identical to that shown in FIGS. 1 and 2, and accordingly, the corresponding reference numbers are applied to the structure shown.

Referring to FIG. 4, as mentioned above, a fitting assembly constructed in accordance with the invention may be used for attaching a cartridge-type heating element 65 to a bulkhead or wall member 20' having an opening 19'. In this embodiment, a tubular fitting 66 is formed from a steel or non-ferrous sheet metal disk in the same general manner as the fitting 26 and the fitting 56. The fitting 66 includes a tubular wall portion 68 having an inner diameter the same as the outer diameter of the cylindrical metal case or sheath 69 of the heating element 65. In a conventional manner, the sheath 69 encloses a high resistance wire (not shown) embedded within a thermally conductive electrical insulation and having opposite ends connected by corresponding low resistance conductors to corresponding quick connecting terminals 72.

The tubular wall portion 68 of the fitting 66 is formed with helical convolutions or threads 73 which are formed in the same manner as the threads 34 described above. The bulkhead fitting 66 is secured to the case or sheath 69 of the cartridge-type heating element 65 by either a magnetic deforming operation as mentioned above in connection with FIG. 3 or by means of conventional solder or a silicon rubber sealant. The outer end portion of the fitting 66 includes a radial flange portion 76 which extends outwardly from the tubular portion 68 and intengrally connects with a rim-like head portion 78 having a polyagonal configuration for receiving a wrench.

A tubular nut member 80 is formed from a sheet metal disk in the same manner as the nut member 40 described above, and includes an outwardly projecting radial flange portion 82 which is secured to the inner surface of the wall member 20', for example, by solder or a continuous weld. The nut member 80 further includes a tubular wall portion 84 which has helical convolutions or threads 86 conforming to the threads 73 of the fitting 66. To assemble the cartridge heating element 65 into the tank wall 20', the fitting 66 and the heating element 65 are threaded into the nut member 80 until the flange portion 76 compresses a resilient washer 38' located between the flange portion and the outer surface of the tank wall 20'.

From the drawing and the above description, it is apparent that a heating element and fitting assembly constructed in accordance with the invention provides desirable features and advantages. For example, by forming the fitting 26 and the nut member 40 from sheet metal disks, the cost of producing the fitting assembly is significantly reduced. A similar significant cost savings is provided by the use of the fitting 66 (FIG. 4) and the nut member 80 for mounting a cartridge-type heating unit on the wall of a heating tank or vessel.

The tubular sheet metal fitting 26 and the tubular nut member 40 also provide a rigid connection between the heating element 10 and the bulkhead or wall 20, and the friction produced between the threads 34 of the fitting 26 and the threads 48 of the nut member 40 assures that the nut member 40 cannot be vibrated loose. Another feature of the invention is provided by magnetically deforming the tubular fitting 55 to compress the tubular portion 59 against the outer surface of the metallic sheath 12' with magnetic pulses as described above in connection with the embodiment shown in FIG. 3. This method of securing the bulkhead fitting to the electrical heating element not only provides for a positive and rigid bonding of the fitting to the element, but also provides a fluid tight seal between the fitting and the heating element. Furthermore, this method significantly reduces the cost of attaching the fitting since it eliminates the need for sand blasting the heating element sheath and other preparation steps and also eliminates the solder.

While the threads 34 and 49 may be rolled into the tubular portions 32 and 48, respectively, the threads are preferably formed by pressing a hydraulic fluid into the drawn tubular portion before the end wall is removed to expand the tubular portion into a surrounding die having corresponding internal threads. Furthermore, while the heating element and fitting assemblies herein described and the methods of producing the same, constitute preferred embodiments of the invention, it is to be understood that the invention is not limited to these precise assemblies and methods, and that changes may be made therein without departing from the scope of the invention which is defined in the appended claims. For example, it is within the scope of the invention to enlarge the diameter of the fitting 26 so that it is capable of receiving both end portions 14 of the heating element 10 in spaced relation instead of having a single fitting 26 for each end portion 14 of the heating element.

What is claimed is:

1. In a method of producing an electrical heating element assembly for mounting within spaced openings of a liquid heating vessel, and including the steps of forming an elongated tubular sheath having opposite end portions, positioning an elongated electrical resistance element within the sheath with a thermally conductive insulation material, and extending terminal members from each end portion of the resistance element through the corresponding end portions of the sheath, the improvement comprising the steps of drawing a sheet of metal to form a pair of tubular fittings each having a flange portion and a tubular wall portion, deforming said tubular wall portion of each said fitting to produce a helical convoluted thread portion having a corrugated wall configuration in axial cross-section, positioning one of said fittings on each of said portions of said tubular sheath with said convoluted thread portion surrounding said end portion of said sheath, and forming a liquid-tight seal between each said fitting and the corresponding said end portion of said sheath.

2. A method as defined in claim 1 including the step of shaping said tubular wall portion of each said fitting to form a cylindrical outer surface extending between said flange portion and said deformed helical thread portion of said fitting.

3. A method as defined in claim 1 including the step of forming an axially projecting peripheral rim on said flange portion of each said fitting.

4. A method as defined in claim 1 wherein said convoluted thread portion is formed with an inner diameter substantially the same as the outer diameter of said tubular sheath.

5. A method as defined in claim 1 including the step of magnetically deforming a portion of said fitting for securing said fitting to said heating element.

6. A method as defined in claim 1 including the step of drawing a sheet of metal to form a tubular nut membe including a flange portion and a tubular wall portion for each said fitting, deforming said tubular wall portion of said nut member to produce a polyagonal portion and helical threads defined by a corrugated wall configuration in axial cross-section, inserting said tubular wall portion of each said fitting and the corresponding end portion of said sheath into an opening within the liquid heating vessel, and threading said tubular wall portion of said nut member onto said tubular wall portion of said fitting.

* * * * *